United States Patent
Bao

(10) Patent No.: US 12,367,666 B2
(45) Date of Patent: Jul. 22, 2025

(54) MULTI-SENSOR FUSION SYSTEM AND AUTONOMOUS MOBILE APPARATUS

(71) Applicant: Beijing Xiaomi Mobile Software Co., Ltd., Beijing (CN)

(72) Inventor: Dinghua Bao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 479 days.

(21) Appl. No.: 17/854,513

(22) Filed: Jun. 30, 2022

(65) Prior Publication Data
US 2023/0306727 A1    Sep. 28, 2023

(30) Foreign Application Priority Data

Mar. 24, 2022  (CN) .......................... 202210303642.3

(51) Int. Cl.
*G06V 10/80* (2022.01)
*B60W 60/00* (2020.01)
(Continued)

(52) U.S. Cl.
CPC ........... *G06V 10/80* (2022.01); *B60W 60/001* (2020.02); *G01S 17/931* (2020.01); *G01S 19/01* (2013.01);
(Continued)

(58) Field of Classification Search
CPC ......... G06V 10/80; G06V 20/56; G01S 17/86
See application file for complete search history.

(56) References Cited

U.S. PATENT DOCUMENTS 9,270,974 B2   2/2016   Zhang et al.
10,250,868 B1  4/2019   Arnold et al.
(Continued)

FOREIGN PATENT DOCUMENTS

CN    108694383 A    10/2018
CN    110133999 A    8/2019
(Continued)

OTHER PUBLICATIONS

Burnicki Martin: "Time Synchronization Accuracy With NTP [Knowledge Base]",Apr. 4, 2019 (Apr. 4, 2019), XP093046149, the whole document, type-Y.
(Continued)

*Primary Examiner* — Tony Ko
(74) *Attorney, Agent, or Firm* — Volpe Koenig

(57) ABSTRACT

The present disclosure relates to a multi-sensor fusion system and an autonomous mobile apparatus. The multi-sensor fusion system includes: a trigger module including a pulse signal output, the pulse signal output being used to output a pulse signal; and a plurality of depth camera modules, at least one depth camera module including a trigger signal generation module and a trigger signal output, the trigger signal generation module being used to generate a trigger signal according to the pulse signal, and the trigger signal output being connected to the trigger signal generation module, and used to output the trigger signal, where the trigger signal is used for triggering the at least one depth camera module to perform an exposure operation, and other depth camera modules perform exposure operations according to the received trigger signal output by the trigger signal output.

16 Claims, 3 Drawing Sheets

(51) Int. Cl.
  *G01S 17/931* (2020.01)
  *G01S 19/01* (2010.01)
  *G06T 7/70* (2017.01)
  *H04N 23/73* (2023.01)
  *H04N 23/90* (2023.01)

(52) U.S. Cl.
  CPC .............. *G06T 7/70* (2017.01); *H04N 23/73* (2023.01); *H04N 23/90* (2023.01); *B60W 2420/403* (2013.01); *B60W 2420/408* (2024.01); *G06T 2207/10024* (2013.01); *G06T 2207/10028* (2013.01); *G06T 2207/20221* (2013.01); *G06T 2207/30252* (2013.01)

(56) References Cited

U.S. PATENT DOCUMENTS

| | | |
|---|---|---|
| 2018/0088584 A1 | 3/2018 | Tascione et al. |
| 2020/0177870 A1 | 6/2020 | Tadi et al. |
| 2020/0186784 A1 | 6/2020 | Woodman et al. |

FOREIGN PATENT DOCUMENTS

| | | | | |
|---|---|---|---|---|
| CN | 110312056 | * | 10/2019 | .............. H04N 5/04 |
| CN | 110312056 B | | 10/2019 | |
| CN | 110460824 A | | 11/2019 | |
| CN | 213092100 U | | 4/2021 | |
| CN | 112861660 A | | 5/2021 | |

OTHER PUBLICATIONS

Extended European Search Report dated May 23, 2023 for European Patent Application No. 22182185.3.
Steinbaeck, J. "A Hybrid Timestamping Approach for Multi-Sensor Perception Systems", 23rd Euromicro Conference on Digital System Design (DSD), IEEE (2020).
Flacco, F. "Real-Time Computation of Distance to Dynamic Obstacles With Multiple Depth Sensors", IEEE Robotics and Automation Letters, IEEE (2017).
European Search Report issued on Jan. 2, 2023 for European Patent Application No. 22182185.3.

* cited by examiner

MULTI-SENSOR FUSION SYSTEM AND AUTONOMOUS MOBILE APPARATUS

CROSS-REFERENCE TO RELATED APPLICATION

The present application claims the benefit of priority to Chinese Application No. 202210303642.3, filed on Mar. 24, 2022, the contents of which are incorporated herein by reference in their entireties for all purposes.

BACKGROUND

For some of current unmanned apparatuses, driving information required by the unmanned apparatuses is obtained through fusion of detection information. The accuracy of driving information is closely related to the accuracy of the fusion of detection_information provided by a plurality of sensors. Therefore, how to improve the fusion accuracy of the fusion of the detection information, in order to improve the accuracy of the driving information has become an urgent technical problem to be solved by technicians in this field.

SUMMARY

The present disclosure provides a multi-sensor fusion system and an autonomous mobile electronic apparatus to solve the deficiencies in the related art.

According to a first aspect of an embodiment of the present disclosure, a multi-sensor fusion system is provided, and includes:
- a trigger module including a pulse signal output, the pulse signal output being used to output a pulse signal; and
- a plurality of depth camera modules, at least one depth camera module including a trigger signal generation module and a trigger signal output, the trigger signal generation module being used to generate a trigger signal according to the pulse signal, and the trigger signal output being connected to the trigger signal generation module, and used to output the trigger signal, where
- the trigger signal is used for triggering the at least one depth camera module to perform an exposure operation, and other depth camera modules perform exposure operations according to the received trigger signal output by the trigger signal output.

According to a second aspect of an embodiment of the present disclosure, an autonomous mobile apparatus is provided, and includes: a multi-sensor fusion system, the multi-sensor fusion system including:
- a trigger module comprising a pulse signal output, the pulse signal output being used to output a pulse signal; and
- a plurality of depth camera modules, at least one depth camera module including a trigger signal generation module and a trigger signal output, the trigger signal generation module being used to generate a trigger signal according to the pulse signal, and the trigger signal output being connected to the trigger signal generation module, and used to output the trigger signal, where
- the trigger signal is used for triggering the at least one depth camera module to perform an exposure operation, and other depth camera modules perform exposure operations according to the received trigger signal output by the trigger signal output.

It should be understood that the above general descriptions and later detailed descriptions are merely exemplary and illustrative, and cannot limit the present disclosure.

BRIEF DESCRIPTION OF THE DRAWINGS

The accompanying drawings, which are incorporated in and constitute a part of the specification, illustrate embodiments consistent with the present disclosure and together with the specification serve to explain the principles of the present disclosure.

DETAILED DESCRIPTION OF THE EMBODIMENTS

Exemplary embodiments will be described in detail here, examples of which are illustrated in the accompanying drawings. When the following description refers to the accompanying drawings, unless otherwise indicated, the same numbers in different drawings indicate the same or similar elements. The implementations described in the following exemplary embodiments do not represent all implementations consistent with the present disclosure. Rather, they are merely examples of devices and methods consistent with some aspects of the present disclosure as detailed in the appended claims.

The terms used in the present disclosure are merely for the purpose of describing specific embodiments, and not intended to limit the present disclosure. The singular forms "one", "said" and "the" used in the present disclosure and the appended claims are also intended to include the plural form unless the context clearly indicates other meanings. It should also be understood that the term "and/or" as used herein refers to and includes any or all possible combinations of one or more associated listed items.

It should be understood that, although the terms "first", "second", "third", etc. may be used to describe various information in the present disclosure, such information should not be limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein may be interpreted as "at the time of" or "when" or "in response to determining that".

For some of current unmanned apparatuses, it is usually necessary to configure a plurality of sensors of the same type or a plurality of sensors of different types to detect information, and driving information required by the unmanned apparatuses is obtained through the fusion of the detected information. The accuracy of the driving information is closely related to the fusion accuracy of the detection information of the plurality of sensors. Therefore, how to improve the fusion accuracy of detection information to improve the accuracy of driving information has become an urgent technical problem to be solved by technicians in this field.

The present disclosure relates to the technical field of terminals, in particular to a multi-sensor fusion system and an autonomous mobile apparatus.

Figure 1:
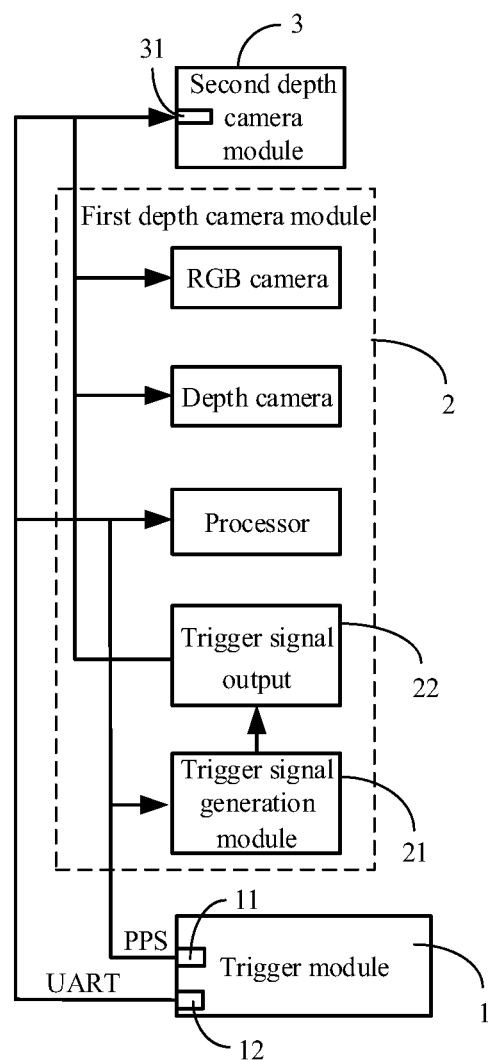
FIG. 1 is a structural block diagram of a multi-sensor fusion system according to an exemplary embodiment.
Figure 2:
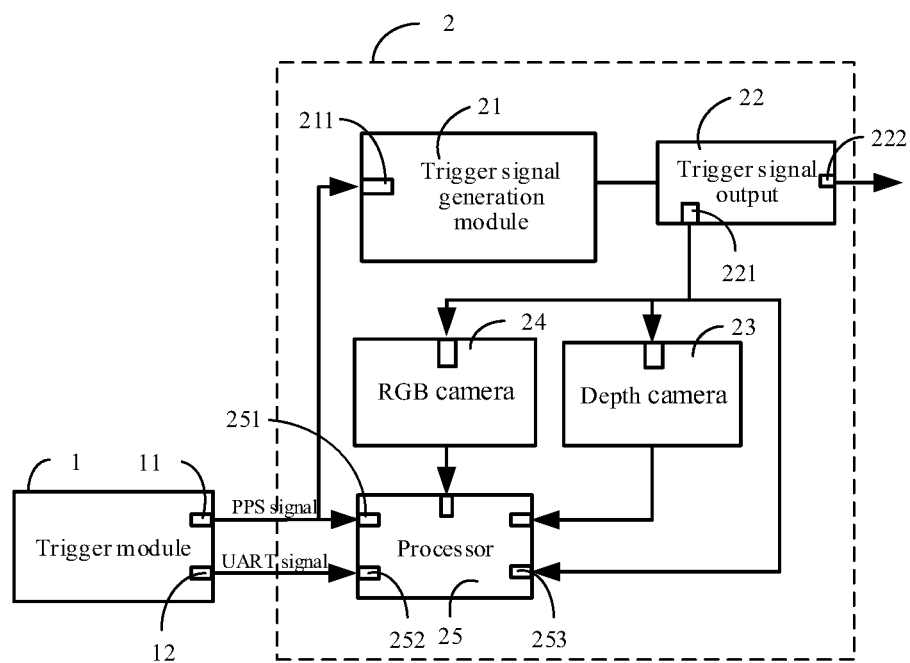
FIG. 2 is a schematic diagram of a connection frame between a trigger module and a first depth camera module according to an exemplary embodiment.

FIG. 1 is a structural block diagram of a multi-sensor fusion system according to an exemplary embodiment. FIG. 2 is a schematic diagram of a connection frame between a trigger module and a first depth camera module 2 according to an exemplary embodiment. As shown in FIG. 1 and FIG. 2, the multi-sensor fusion system includes a trigger module 1, a first depth camera module 2, and a second depth camera module 3. The trigger module 1 may include a pulse signal output 11, and the pulse signal output 11 may be used to output a pulse signal generated by a GPS (global positioning system) positioning module. The first depth camera module 2 may include a trigger signal generation module 21 and a trigger signal output 22. The trigger signal generation module 21 may be connected to the pulse signal output 11, such that the trigger signal generation module 21 may be used to generate a trigger signal according to the pulse signal output by the pulse signal output terminal 11. The trigger signal output 22 may be connected to the trigger signal generation module 21, such that the trigger signal output 22 may output a received trigger signal. The pulse signal output 11 may include a pulse per second (PPS) pulse signal output, and correspondingly, the pulse signal may include a PPS pulse signal.

Still as shown in FIG. 1, the trigger signal output from the trigger signal output 22 may be output to the second depth camera module 3, and after receiving the trigger signal, the second depth camera module 3 may perform an exposure operation according to the received trigger signal to obtain corresponding image information. Similarly, when a trigger signal is generated and transmitted to a camera included in the first depth camera module 2, the camera may be triggered to perform an exposure operation to obtain corresponding image information.

In the embodiment shown in FIG. 1, the multi-sensor fusion system includes a single first depth camera module 2 and a single second depth camera module 3 as an example for description. In fact, in other embodiments, the multi-sensor fusion system may also include a plurality of first depth camera modules 2 and a single second depth camera module 3, or the multi-sensor fusion system may also include a single first depth camera module 2 and a plurality of second depth camera modules 3, or the multi-sensor fusion system may also include a plurality of first depth camera modules 2 and a plurality of second depth camera modules 3. When the multi-sensor fusion system includes a plurality of first depth camera modules 2, any second depth camera module 3 may be triggered by a trigger signal sent by any first depth camera module 2 among the plurality of first depth camera modules 2. In some other embodiments, the multi-sensor fusion system may also include only a plurality of first depth camera modules 2, and the trigger signal generation module 21 included in each first depth camera module 2 may generate a trigger signal for triggering based on the received pulse signal, which may be specifically designed as needed, and is not limited in the present disclosure.

It can be seen from the above embodiments that through the technical solutions of the present disclosure, the plurality of depth camera modules in the multi-sensor fusion system may be triggered simultaneously by the trigger module 1, or one of the depth camera modules outputs a trigger signal to trigger other depth camera modules, such that errors between trigger time of the plurality of depth camera modules may be reduced, which is conductive to subsequent fusion of image information at the same time by the plurality of depth camera modules, and improvement of the fusion accuracy.

For a multi-sensor fusion system including a single first depth camera module 2 and a single second depth camera module 3, or, a single first depth camera module 2 and a plurality of second depth camera modules 3, the first depth camera module 2 may be determined as a main camera, and the single or the plurality of second depth camera modules 3 may be determined as auxiliary cameras. Still as shown in FIG. 1 and FIG. 2, the first depth camera module 2 may include the trigger signal generation module 21 and the trigger signal output 22 in the above embodiment, and the second depth camera module 3 may include a trigger signal input 31. The signal input 31 may be connected to the trigger signal output 22 of the first depth camera module 2, such that the second depth camera module 3 may receive the trigger signal output by the trigger signal output 22 via the trigger signal input 31. On this basis, it may be avoided to repeated set a trigger signal generation module 21 and a trigger signal output 22 in the second depth camera module 3, which is beneficial to simplifying the structure of the second depth camera module 3 and reducing errors of trigger time.

In each of the above embodiments, each first depth camera module 2 may include a depth camera 23 and a red-green-blue (RGB) camera 24. Similarly, each second depth camera module 3 may also include a single or a plurality of cameras, and the cameras may include one or more of a depth camera, an RGB camera, a wide-angle camera, or a telephoto camera, etc., which is not limited in the present disclosure. The trigger signal generation module 21 may further include a pulse signal input 211, and the pulse signal input 211 may be connected to the pulse signal output 11. The trigger signal output 22 may include a first output 221 and a second output 222. The first output 221 may be used to output the trigger signal generated by the trigger signal generation module 21 to the depth camera 23 and the RGB camera 24 of the first depth camera module 2. The second output 222 may be used to output the trigger signal generated by the trigger signal generation module 21 to the camera of the second depth camera module 3. Thus, errors between the trigger time of a plurality of cameras included in the same depth camera module may be reduced, and at the same time, errors between the trigger time of a plurality of cameras included in different depth camera modules may also be reduced. The trigger signal output 22 and the trigger signal generation module 21 may be integrated into one integrated module, or may be two separate modules, which is not limited in the present disclosure.

In some examples, the trigger signal may include a synchronous frequency multiplied pulse signal. Specifically, the trigger signal generation module 21 may generate, based on the received pulse signal, a synchronous frequency multiplied pulse signal corresponding to the pulse signal, for example, a synchronous high-frequency signal of 20 Hz or 30 Hz. The trigger signal generation module 21 may be a field programmable gate array (FPGA) module, or may be any other circuit module capable of generating the synchronous frequency multiplied pulse signal corresponding to the signal, which is not limited in the present disclosure. Compared with other technical solutions in which a first rising edge is used as the trigger time when the main camera is automatically triggered, the technical solution that the depth camera 23 and the RGB camera 24 are triggered at the same time by the synchronous frequency multiplied pulse signal may control which rising edge or falling edge of the synchronous frequency multiplied pulse signal is received to trigger the depth camera 23, the RGB camera 24 and the camera of the second depth camera module 3, and phase control is achieved.

Further, in order to improve the fusion accuracy of the plurality of depth camera modules, still as shown in FIG. 1 and FIG. 2, taking the first depth camera module 2 as an example, the first depth camera module 2 may further include a processor 25. The processor 25 may include a first input 251 and a serial input port 252. The trigger module 1 may include the GPS positioning module, and the GPS positioning module may include a serial output port 12. The serial input port 252 is to be connected to the serial output port 12 of the GPS positioning module to receive a serial signal output by the serial output 12. The first input 251 is connected to the pulse signal output 11 to receive the pulse signal output by the pulse signal output 11.

The processor 25 may record a first local time when a target edge of the pulse signal is received, obtain a universal time coordinated (UTC) time from the received serial signal when the target edge of the pulse signal is received, record a second local time when the UTC time is obtained, determine current UTC time corresponding to the second local time according to the first local time, the second local time and the obtained UTC time, and then update local time of the processor 25 according to the current UTC time. Specifically, the current UTC time is determined as a new second local time, such that the local time of the processor 25 may be aligned with the UTC time. It can be understood that the GPS positioning module may obtain a standard time signal from a GPS satellite, and the local time of the processor 25 is further updated according to the standard time signal via interaction between the GPS positioning module and the processor 25. The processor 25 may also receive the image information obtained by the depth camera 23 and the RGB camera 24, and record timestamps of the image information obtained by the depth camera 23 and the RGB camera 24 according to the updated local time, so as to reduce or eliminate the deviation between the timestamps and the standard time signal. Similarly, each second depth camera module 3 may also include a processor, and local time of the processor of the second depth camera module 3 may also be updated via the GPS positioning module. For details, please refer to the embodiment of the GPS positioning module updating the local time of the processor 25 of the first depth camera module 2. The processor of the second depth camera module 3 may also record a timestamp of received image information according to the updated local time, so as to reduce a timestamp error caused by respective local clock errors of the first depth camera module 2 and the second depth camera module 3, which is beneficial to realizing time alignment of the depth camera modules via the standard time signal, facilitates fusion of data of the depth camera modules and other sensors, and reduces or eliminates the deviation between the local time of the processor 25 and the UTC time compared with a solution of timing based on a local clock of the processor.

The processor 25 may generate a first interrupt signal via the first input 251 when the target edge of the pulse signal is received, and the processor 25 may obtain the accurate local time when the target edge occurs by recording the time of the first interrupt signal, that is, the first local time is obtained, such that the reliability of the first local time may be effectively guaranteed. Regarding how the processor 25 records a timestamp, when the trigger signal is the synchronous frequency multiplied pulse signal, the synchronous frequency multiplied pulse signal is suppled to a second input 253 of the processor 25, and when a trigger edge (rising edge or falling edge) of the synchronous frequency multiplied pulse signal is received, a second interrupt signal is generated, and local time corresponding to the second interrupt signal is read, and recorded as a timestamp of image information based on the local time. Similarly, the manner in which the processor of the second depth camera module 3 records a timestamp of image information may by understood by reference to the above-described embodiment, and the description will not be repeated here.

The serial signal may include GPRMC data or GPGGA data output by the GPS positioning module. The GPS positioning module may output one GPRMC datum or GPGGA datum after each pulse signal is output. The processor 25 may obtain the UTC time of the target edge by analyzing the GPRMC data or GPGGA data. The target edge may include a rising edge or a falling edge of the pulse signal. When the target edge is a rising edge, the processor 25 may obtain UTC time corresponding to the rising edge by analyzing the GPRMC data or the GPGGA data. When the target edge is a falling edge, the processor 25 may obtain the UTC time corresponding to the falling edge by analyzing the GPRMC data or the GPGGA data. The GPGGA data are a GPS data output format statement, and usually include 17 fields: sentence tag, world time, latitude, latitude hemisphere, longitude, longitude hemisphere, positioning quality indicator, number of satellites used, horizontal precision factor, ellipsoid height, altitude unit, geoid height anomaly difference, height unit, differential GPS data period, differential reference base station label, and checksum end marker, separated by commas.

In the above embodiment, the processor 25 may further include a calculation module. It is assumed that the first local time is T1, the UTC time is T2, the second local time is T3, and the current UTC time needing to be determined by the processor 25 and corresponding to the second local time T3, is T4. In some embodiments, a difference between the first local time T1 and the second local time T3 recorded based on non-updated local time of the processor 25 may be determined as a difference between the UTC time T2 and the current UTC time T4 corresponding to the second local time T3. Thus, the calculation module may calculate the current UTC time T4 based on a sum of the UTC time T2 and the difference between the second local time T3 and the first local time T1, namely, T4=T2+(T3−T1). In other embodiments, since there may be errors between the local time of the processor 25 and the UTC time before updating, the difference between the first local time T1 and the second local time T3 may be calibrated first, and then the current UTC time T4 is calculated by adding the difference and the UTC time T2. A calibration method may be the difference between the first local time T1 and the second local time T3 multiplied by a weight, or the difference between the first local time T1 and the second local time T3 minus or plus a calibration value obtained based on experiments, which is not limited in the present disclosure.

Further, the GPS positioning module continuously sends pulse signals to the processor 25 at a certain frequency, while in fact, in some cases, when the error of the local time of the processor 25 is within an allowable range, the local time may not be updated, thus reducing the waste of resources of the processor 25. Thus, the processor 25 may consider that the error of the current local time of the processor 25 exceeds the allowable range when a difference between the second local time T3 and the current UTC time T4 is greater than a preset threshold, and in that case update the local time according to the current UTC time T4.

Figure 3:
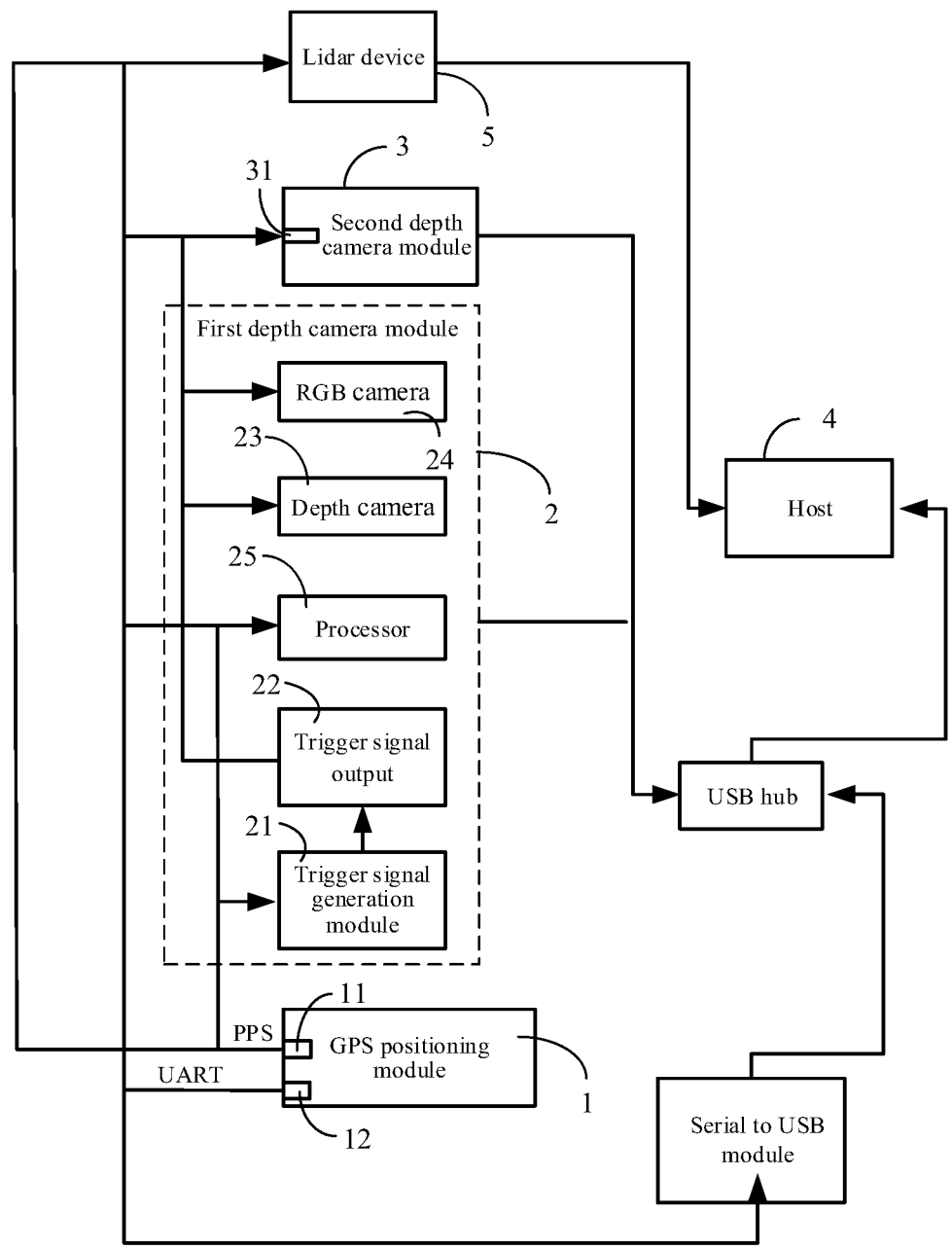
FIG. 3 is a structural block diagram of another multi-sensor fusion system according to an exemplary embodiment.

As shown in FIG. 3, the multi-sensor fusion system may further include a host 4. The host 4 may be in communication connection with the first depth camera module 2 and the second depth camera module 3 respectively via, for example, a USB data line according to the embodiment provided by the present disclosure, or via wireless communication according to other embodiments. The host 4 is configured to receive the image information obtained by the first depth camera module 2 and the second depth camera module 3, and fuse the image information according to timestamps recorded according to the updated local time of the first depth camera module 2 and the second depth camera module 3. The implementation of the first depth camera module 2 recording the timestamp of the image information and the implementation of the second depth camera module 3 recording the timestamp of the image information may be understood by reference to the above-described embodiment. On this basis, by updating time via the GPS positioning module, the local time of the first depth camera module 2 and the second depth camera module 3 may be aligned with the world time to reduce fusion errors of different depth camera modules caused by time errors of the first depth camera module 2 and the second depth camera module 3. The specific implementation of the GPS positioning module updating the local time of the first depth camera module 2 and the second depth camera module 3 may be understood by reference to the above-described embodiment, which description will not be repeated here.

Still as shown in FIG. 3, the GPS positioning module may also be in communication connection with the host 4 directly or indirectly via other communication elements. Due to the positioning function of the GPS positioning module, the GPS positioning module may also be used to position absolute positioning information of an autonomous mobile apparatus to which the GPS positioning module belongs, where the absolute positioning information is relative to the earth coordinate system. The host is configured to obtain the absolute positioning information, and obtain relative positioning information of the autonomous mobile apparatus according to the image information. The relative positioning information may be based on any reference point in the traveling process of the autonomous mobile apparatus, and specifically, the relative positioning information may be obtained by adopting the Simultaneous Localization and Mapping SLAM fusion algorithm.

The absolute positioning information and the relative positioning information are used for planning a motion path of the autonomous mobile apparatus. For example, in some places or areas with weak GPS signals, the motion path may be planned via the relative positioning information, and in some places or areas with good GPS signals, the motion path may be planned via the absolute positioning information, thus improving the motion accuracy. At the same time, the absolute positioning information may also be used for correcting errors of the relative positioning information. For example, a distance between a reference point and a current position point may be obtained by comparing absolute positioning information of the reference point with absolute positioning information of the current position point, so as to correct the relative positioning information. The positioning information obtained by the GPS positioning module may be output via the serial output port 12, and then sent to the host 4 via a serial to USB module of the fusion system.

In other embodiments, still as shown in FIG. 3, the multi-sensor fusion system may further include a Light Detection and Ranging (LIDAR) device 5. The LIDAR device 5 may be in communication connection with the GPS positioning module and the host 4 respectively directly or indirectly via other communication elements, which is not limited in the present disclosure. Specifically, the LIDAR device 5 may be connected to the pulse signal output 11 and the serial output port 12 of the GPS positioning module respectively, such that local time of the LIDAR device 5 may be updated by using the GPS positioning module. An updating method may refer to the above embodiment of the GPS positioning module updating the local time of the first depth camera module 2, which will not be repeated here. Moreover, the LIDAR device 5 may also be triggered according to the received pulse signal output by the pulse signal output 11 to obtain distance information and record a timestamp of the obtained distance information according to the updated local time. The host 4 obtains the distance information and the timestamp of the distance information due to communication connection between the LIDAR devices 5, may also receive the image information of the first depth camera module 2 and the second depth camera module 3 and the timestamps of the image information, and then may fuse the distance information and the image information according to the timestamps, thus improving the content richness of a fusion image. The fusion accuracy may be improved by updating time via the GPS positioning module.

It should be noted that the embodiment shown in FIG. 3 is only illustrative, and in other embodiments, the multi-sensor fusion system may also include other sensors, such as a microphone module or an inertial measurement unit (IMU) sensor, which are not limited by the present disclosure. There may be one or more sensors of each type, which are not limited by the present disclosure.

Based on the technical solutions of the present disclosure, an autonomous mobile apparatus is further provided. The autonomous mobile apparatus may include the multi-sensor fusion system according to any one of the above embodiments. The autonomous mobile apparatus may include an autonomous vehicle or an unmanned aerial vehicle, etc., which is not limited by the present disclosure.

Other implementations of the present disclosure will be apparent to those skilled in the art from consideration of the specification and practice of the present disclosure herein. The present disclosure is intended to cover any variations, uses, or adaptations of the present disclosure following the general principles of the present disclosure and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

According to a first aspect of an embodiment of the present disclosure, a multi-sensor fusion system is provided, and includes:

a trigger module including a pulse signal output, the pulse signal output being used to output a pulse signal; and
a plurality of depth camera modules, at least one depth camera module including a trigger signal generation module and a trigger signal output, the trigger signal generation module being used to generate a trigger signal according to the pulse signal, and the trigger signal output being connected to the trigger signal generation module, and used to output the trigger signal, where the trigger signal is used for triggering the at least one depth camera module to perform an exposure operation, and other depth camera modules perform exposure operations according to the received trigger signal output by the trigger signal output.

In some examples, the plurality of depth camera modules include a main camera and at least one auxiliary camera; the main camera includes the trigger signal generation module and the trigger signal output; and each auxiliary camera includes a trigger signal input, and the trigger signal input is used to receive the trigger signal output by the trigger signal output.

In some examples, each main camera includes a depth camera and a red-green-blue (RGB) camera; the trigger signal generation module further includes a pulse signal input, and the pulse signal input is connected to the pulse signal output; and the trigger signal output includes:

a first output used to output the trigger signal to the depth camera and RGB camera of the main camera; and a second output used to output the trigger signal to a camera of each auxiliary camera.

In some examples, the trigger module includes a GPS (global positioning system) positioning module, the GPS positioning module further includes a serial output port, each depth camera module includes a processor, the processor includes a first input and a serial input port, the serial input port is used to be connected to the serial output port of the GPS positioning module to receive a serial signal output by the serial output port, and the first input is connected to the pulse signal output to receive the pulse signal output by the pulse signal output; and the processor is configured to record first local time when a target edge of the pulse signal is received, analyze universal time coordinated (UTC) time when the target edge is received according to the serial signal, and record second local time when the UTC time is obtained, so as to determine current UTC time corresponding to the second local time according to the first local time, the second local time and the UTC time, and update local time of the processor according to the current UTC time.

In some examples, the processor includes a calculation module, and the calculation module calculates the current UTC time based on a sum of the UTC time and a difference between the second local time and the first local time.

In some examples, the processor is configured to update the local time when a difference between the second local time and the current UTC time is greater than a preset threshold.

In some examples, the trigger module includes a GPS positioning module, and the GPS positioning module is used to update local time of the depth camera modules, and processors of the depth camera modules record a timestamp of obtained image information according to the updated local time; and the multi-sensor fusion system further includes:

a host in communication connection with each depth camera module and configured to receive the image information obtained by the depth camera modules, and fuse the image information according to the timestamp.

In some examples, the multi-sensor fusion system further includes:

a LIDAR device in communication connection with the GPS positioning module and the host respectively, the GPS positioning module being further used to update local time of the LIDAR device, where the LIDAR device is triggered according to the received pulse signal output by the pulse signal output to obtain distance information and record a timestamp of the obtained distance information according to the updated local time; and the host fuses the distance information and the image information according to the timestamp.

In some examples, the GPS positioning module is in communication connection with the host, and the GPS positioning module is further used to position absolute positioning information of an autonomous mobile apparatus to which the GPS positioning module belongs; and the host is configured to obtain the absolute positioning information, and obtain relative positioning information of the autonomous mobile apparatus according to the image information, the absolute positioning information and the relative positioning information being used for planning a motion path of the autonomous mobile apparatus.

According to a second aspect of an embodiment of the present disclosure, an autonomous mobile apparatus is provided, and includes:

the multi-sensor fusion system according to any one of the above embodiments.

What is claimed is:

1. A multi-sensor fusion system, comprising:

a trigger module comprising a pulse signal output, the pulse signal output being used to output a pulse signal; and a plurality of depth camera modules, at least one depth camera module comprising a trigger signal generation module and a trigger signal output, the trigger signal generation module being used to generate a trigger signal according to the pulse signal, and the trigger signal output being connected to the trigger signal generation module, and used to output the trigger signal, wherein the trigger signal is used for triggering the at least one depth camera module to perform an exposure operation, and other depth camera modules perform exposure operations according to the received trigger signal output by the trigger signal output;

wherein the trigger module comprises a global positioning system (GPS) positioning module and the GPS positioning module is used to update local time of the depth camera modules, and processors of the depth camera modules record a timestamp of obtained image information according to a updated local time; and the multi-sensor fusion system further comprises:

a host in communication connection with each depth camera module and configured to receive the image information obtained by the depth camera modules, and fuse the image information according to the timestamp.

2. The multi-sensor fusion system according to claim 1, wherein the plurality of depth camera modules comprise a main camera and at least one auxiliary camera; the main camera comprises the trigger signal generation module and the trigger signal output; and each auxiliary camera comprises a trigger signal input, and the trigger signal input is used to receive the trigger signal output by the trigger signal output.

3. The multi-sensor fusion system according to claim 2, wherein each main camera comprises a depth camera and a red-green-blue (RGB) camera; the trigger signal generation module further comprises a pulse signal input, and the pulse signal input is connected to the pulse signal output; and the trigger signal output comprises:
a first output used to output the trigger signal to the depth camera and the RGB camera of the main camera; and
a second output used to output the trigger signal to a camera of each auxiliary camera.

4. The multi-sensor fusion system according to claim 1, wherein the GPS positioning module further comprises a serial output port, each depth camera module comprises a processor, the processor comprises a first input and a serial input port, the serial input port is used to be connected to the serial output port of the GPS positioning module to receive a serial signal output by the serial output port, and the first input is connected to the pulse signal output to receive the pulse signal output by the pulse signal output; and the processor is configured to record a first local time when a target edge of the pulse signal is received, obtain a universal time coordinated (UTC) time from the serial signal when the target edge is received, and record a second local time when the UTC time is obtained, so as to determine a current UTC time corresponding to the second local time according to the first local time, the second local time and the obtained UTC time, and update local time of the processor according to the current UTC time.

5. The multi-sensor fusion system according to claim 4, wherein the processor comprises a calculation module, and the calculation module calculates the current UTC time based on a sum of the obtained UTC time and a difference between the second local time and the first local time.

6. The multi-sensor fusion system according to claim 4, wherein the processor is configured to update the local time when a difference between the second local time and the current UTC time is greater than a preset threshold.

7. The multi-sensor fusion system according to claim 1, further comprising:
a LIDAR device in communication connection with the GPS positioning module and the host respectively, the GPS positioning module being further used to update local time of the LIDAR device, wherein
the LIDAR device is triggered according to the received pulse signal output by the pulse signal output to obtain distance information and record a timestamp of the obtained distance information according to the updated local time; and
the host fuses the distance information and the image information according to the timestamp.

8. The multi-sensor fusion system according to claim 1, wherein the GPS positioning module is in communication connection with the host, and the GPS positioning module is further used to position absolute positioning information of an autonomous mobile apparatus to which the GPS positioning module belongs; and
the host is configured to obtain the absolute positioning information, and obtain relative positioning information of the autonomous mobile apparatus according to the image information, the absolute positioning information and the relative positioning information being used for planning a motion path of the autonomous mobile apparatus.

9. An autonomous mobile apparatus, comprising: a multi-sensor fusion system, the multi-sensor fusion system comprising:

a trigger module comprising a pulse signal output, the pulse signal output being used to output a pulse signal; and
a plurality of depth camera modules, at least one depth camera module comprising a trigger signal generation module and a trigger signal output, the trigger signal generation module being used to generate a trigger signal according to the pulse signal, and the trigger signal output being connected to the trigger signal generation module, and used to output the trigger signal, wherein
the trigger signal is used for triggering the at least one depth camera module to perform an exposure operation, and other depth camera modules perform exposure operations according to the received trigger signal output by the trigger signal output;
wherein the trigger module comprises a global positioning system (GPS) positioning module, and the GPS positioning module is used to update local time of the depth camera modules, and processors of the depth camera modules record a timestamp of obtained image information according to a updated local time; and
the multi-sensor fusion system further comprises:
a host in communication connection with each depth camera module and configured to receive the image information obtained by the depth camera modules, and fuse the image information according to the timestamp.

10. The autonomous mobile apparatus according to claim 9, wherein the plurality of depth camera modules comprise a main camera and at least one auxiliary camera; the main camera comprises the trigger signal generation module and the trigger signal output; and
each auxiliary camera comprises a trigger signal input, and the trigger signal input is used to receive the trigger signal output by the trigger signal output.

11. The autonomous mobile apparatus according to claim 10, wherein each main camera comprises a depth camera and a red-green blue (RGB) camera; the trigger signal generation module further comprises a pulse signal input, and the pulse signal input is connected to the pulse signal output; and
the trigger signal output comprises:
a first output used to output the trigger signal to the depth camera and the RGB camera of the main camera; and
a second output used to output the trigger signal to a camera of each auxiliary camera.

12. The autonomous mobile apparatus according to claim 9, wherein the GPS positioning module further comprises a serial output port, each depth camera module comprises a processor, the processor comprises a first input and a serial input port, the serial input port is used to be connected to the serial output port of the GPS positioning module to receive a serial signal output by the serial output port, and the first input is connected to the pulse signal output to receive the pulse signal output by the pulse signal output; and
the processor is configured to record first local time when a target edge of the pulse signal is received, obtain universal time coordinated (UTC) time from the received serial signal when the target edge is received, and record second local time when the UTC time is obtained, so as to determine current UTC time corresponding to the second local time according to the first local time, the second local time and the obtained UTC time, and update local time of the processor according to the current UTC time.

13. The autonomous mobile apparatus according to claim 12, wherein the processor comprises a calculation module, and the calculation module calculates the current UTC time based on a sum of the obtained UTC time and a difference between the second local time and the first local time.

14. The autonomous mobile apparatus according to claim 12, wherein the processor is configured to update the local time when a difference between the second local time and the current UTC time is greater than a preset threshold.

15. The autonomous mobile apparatus according to claim 9, further comprising:
- a LIDAR device in communication connection with the GPS positioning module and the host respectively, the GPS positioning module being further used to update local time of the LIDAR device, wherein
- the LIDAR device is triggered according to the received pulse signal output by the pulse signal output to obtain distance information and record a timestamp of the obtained distance information according to the updated local time; and the host fuses the distance information and the image information according to the timestamp.

16. The autonomous mobile apparatus according to claim 9, wherein the GPS positioning module is in communication connection with the host, and the GPS positioning module is further used to position an autonomous mobile apparatus to which the GPS positioning module belongs based on absolute positioning information; and the host is configured to obtain the absolute positioning information, and obtain relative positioning information of the autonomous mobile apparatus according to the image information, the absolute positioning information and the relative positioning information being used for planning a motion path of the autonomous mobile apparatus.

* * * * *

UNITED STATES PATENT AND TRADEMARK OFFICE
CERTIFICATE OF CORRECTION

| | | |
|---|---|---|
| PATENT NO. | : 12,367,666 B2 | Page 1 of 1 |
| APPLICATION NO. | : 17/854513 | |
| DATED | : July 22, 2025 | |
| INVENTOR(S) | : Dinghua Bao | |

It is certified that error appears in the above-identified patent and that said Letters Patent is hereby corrected as shown below:

In the Specification
In Column 1, Line 18, delete "detection_information" and insert -- detection information --, therefor.
In Column 4, Line 19, delete "to repeated" and insert -- to repeatedly --, therefor.
In Column 6, Line 7, delete "may by" and insert -- may be --, therefor.
In Column 7, Line 45, delete "Simultaneous Localization and Mapping SLAM" and insert
-- Simultaneous Localization and Mapping (SLAM), --, therefor.

In the Claims
In Column 10, Line 48, in Claim 1, delete "module and" and insert -- module, and --, therefor.
In Column 12, Line 38, in Claim 11, delete "red-green blue" and insert -- red-green-blue --, therefor.

Signed and Sealed this
Thirtieth Day of September, 2025

John A. Squires
*Director of the United States Patent and Trademark Office*